United States Patent Office 3,345,880
Patented Oct. 10, 1967

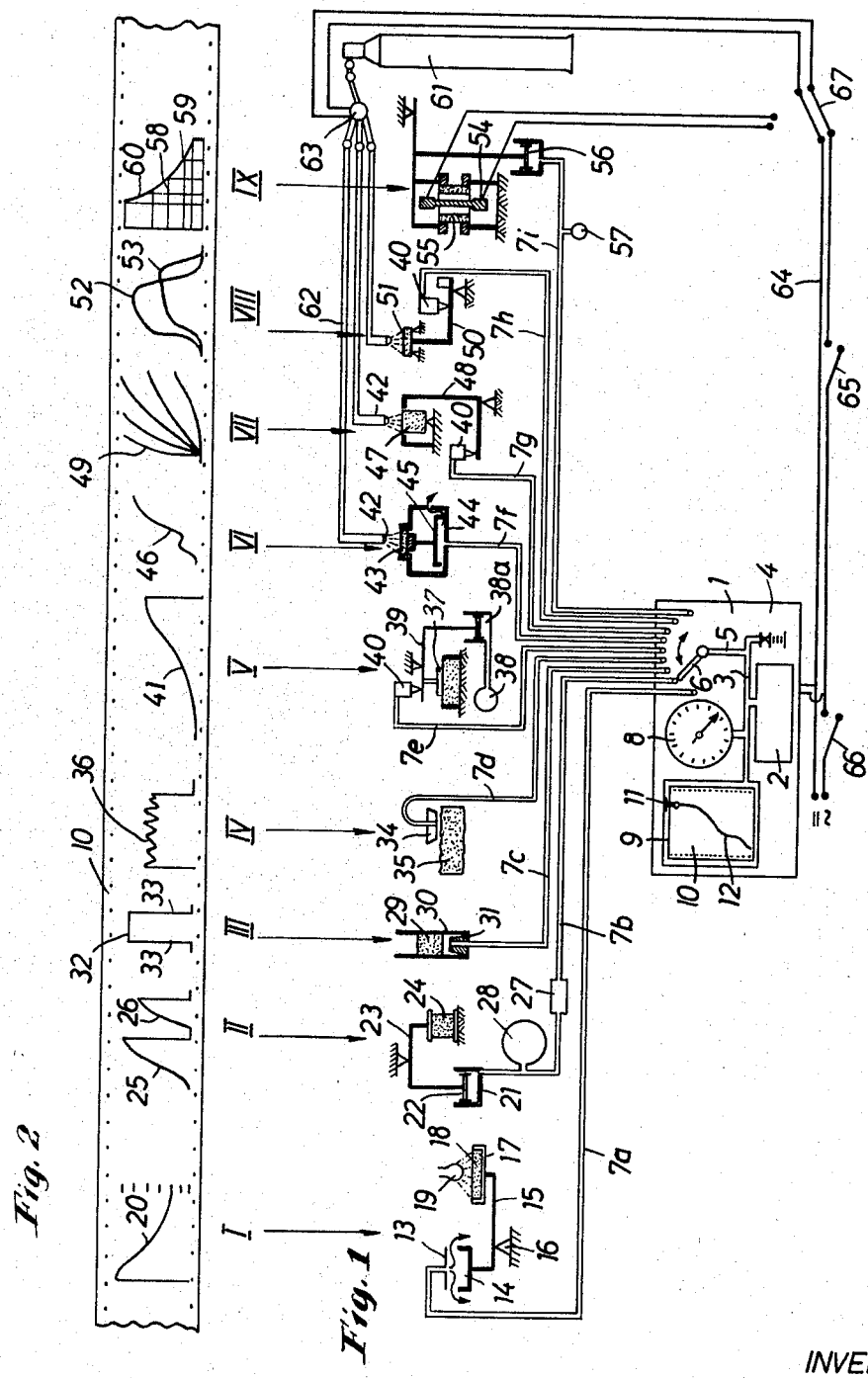

3,345,880
APPARATUS FOR MEASUREMENT OF PHYSICAL
CHARACTERISTICS OF SOLID BODIES
Dietmar Boenisch, Haselsteig 11, Aachen, Germany
Filed June 3, 1964, Ser. No. 372,418
Claims priority, application Germany, June 7, 1963,
B 72,203
1 Claim. (Cl. 73—432)

The invention is concerned with a method and apparatus for measurement of the physical properties of solid bodies, particularly mold materials or the like refractory materials in the foundry industry. Moreover in the measuring principle of the invention shape changes of solid materials, for example, specimens even of road surfacing under heating or also their behavior with aging can be determined. Furthermore the roughness of a surface can also be ascertained or continually recorded in a greatly magnified roughness curve.

The invention is however especally provided for ascertaining the characteristics of mold materials or the like refractory materials, which find application particularly in the foundry industry, thus for the determination of strength, gas permeability, surface roughness, mold wall yieldability, compressive stress, expansion, hot bending or hot tensile strength. It is at the same time applicable for the testing of specimens not only at room temperature, but also at higher temperatures up to the melting point.

By previous tests of the physical characteristics of solid specimens in principle for each property to be measured there is used a particular device which exposes the body to an influence the effect of which is tested. Such device includes also the measuring device for retention of the result obtained. Corresponding to the most diverse requirements or stresses to which a solid body is exposed, the devices are also constructed appropriately for the test purpose and also the recording devices operate according to different principles.

For strength testing of a molding sand, that is, for the testing of its compressive strength or also of its shear strength, the test specimens are exposed, for example, to a mechanically working lever system and the breaking load is ascertained from the excursion of a pendulum weight or is read from a spring pressure loaded gauge. For testing of the aforenamed strength characteristics, the use of a hydraulic system is also known, wherein the test load is read from an oil pressure manometer. For the testing of certain high temperature properties it has already been proposed that the result of the measurement be transmitted electronically to a recording drum which records the heat strength against the heat deformation. Hitherto each testing system has had a recording system particularly accommodated or suited to it. This required each testing apparatus to include in a structural unit a particular measuring device belonging thereto. These arrangements are expensive in construction and since the test device and measuring device represent a unitary construction are relatively sensitive, because the measuring device cannot be sufficiently shielded from the influence applied on the test specimen during the test. The result of this also is that the driving systems of the many diverse commercial testing apparatuses for the measuring of diverse types of physical characteristics are different, and the measuring means must be suited to the corresponding system.

The present invention proceeds with the object of simplifying in construction and operation testing devices of the most diverse types for measurement of the most diverse characteristics; and of segregating the test devices and measuring devices, and to provide one single unitary system which permits equipping the most diverse types of testing devices and testing systems with a unitary power and measuring principle. For this purpose, for the measurement of the physical characteristics of solid bodies, especially of mold materials or like refractory materials in the foundry industry, by the present invention it is proposed that the specimen to be tested be exposed directly or indirectly to a continuous air stream, and that the effect of the property to be measured, or of the change of the property arising during the duration of the test, be brought to influence the continually flowing air stream, and that the changes thereby arising be continually registered through an air recorder. Either pressure or vacuum air can be used. The pressure, the quantity or also the flow velocity of the air can be the measured quantity.

A further proposal in accordance with the invention is that the most diverse types of testing devices for measurement of physical characteristics, particularly molding sand testing devices, be connected to a central and constructionally independent control apparatus, and that by the latter they be provided, or be controlled by, a continual air stream; and that the results of the selectively connected diverse testing devices can be registered continually in one and the same air recorder, located in the central apparatus and having preferably a selectively adjustable paper advance speed.

These proposals in accordance with the invention permit using test devices which, in accordance with a measuring principle proposed in accordance with the invention, determine characteristics of solid bodies required in practice, especially those of molding materials in the foundry industry. Hence in particular with respect to the fact that this testing and measuring principle permits of several modifications for the testing, it is proposed:

(1) To use a piston-cylinder system in which an increasing excess pressure is produced, wherein the piston force works on the test specimen through a corresponding lever system and the load increase up to breaking load is continually registered through an air responsive recorder, for example, as a proportional pressure change.

(2) The use of a valve which converts in stepless manner the quite small passage change, resulting from the form change of the body under testing for example, into a considerable air pressure change, which then is continually registered through an air pressure recorder.

(3) To conduct the air stream through or upon a test specimen itself, with the air stream being throttled correspondingly to the surface roughness or gas permeability, and the pressure change proportional to the throttling, and in accordance with a corresponding standardization representing the measured quantity itself.

(4) The use of an air float which, for example, can be constructed as a metal disc which floats upon a continually flowing air stream, whereby a loading of the float constricts the air stream between the float and its support, and causes a pressure rise in the air supply line proportional to the loading of the float; through which, for example, sand weight or mechanical pressures produced through form changes of the sand, or variations of these can be most sensitively and steplessly measured and recorded.

The apparatus in accordance with the invention for carrying out the aforementioned methods is comprised of an air pressure recorder having a continuous paper advance (put together into a constructional unity) and an electric pump, preferably an oscillating lever pump with an air capacity of from 800 to 2,000 liters per hour and a pressure up to 5 meters of water, wherein further there is included a manometer and at least a separable connection means for the selective connecting of different types of test devices. Advantageously there are present several air connectors with them a switch provided for the selective connection to the air source of one of the several connectors. Furthermore it is proposed that the control apparatus be provided with one or more switches for simultaneous start of the air responsive recorder and of the testing devices connected to the control apparatus with the thereto necessary actuating devices.

An apparatus in accordance with the invention is further comprised of an air line running from the pump and air recorder of the control device, which is connected to a ram cylinder containing the test specimen. Thereby can be measured the gas permeability of cold or hot materials, in particular compacted molding sands, for example, also the change of gas permeability upon heating of the surface.

For measurement of the surface condition, especially roughness of a solid body, for example the cast skin, or also the roughness of a mold sand surface, it is proposed that the air line from the control apparatus pump open through a nozzle, which is traversable on or in a quite small spacing from the surface, for exploring the surface.

In the drawings,

FIG. 1 is a generalized or schematic representation of the overall apparatus for carrying out the present invention; and FIG. 2 represents a strip of recorder chart paper on which appear recorded test curves each exemplary of those derived from or provided by operation of the particular test device represented directly therebeneath in FIG. 1.

The invention is explained in greater detail with reference to the exemplary embodiment of the invention shown in the drawings but is not limited to the form there represented, but rather there are possible further modifications lying in the field of the invention. Further the test devices designated I to IX connected to the control apparatus are merely schematically represented; and also further test devices are attachable. Likewise there are represented on a chart paper strip, test traces or curves related to the respective individual test devices located therebelow in FIG. 1.

The schematically represented control apparatus 1 has an electrically driven pump 2 discharging into air line 3 including an excess pressure relief valve 4; the pump according to the embodiment taking the form of an oscillating lever pump. Also for connection of the line 3 to the test devices I–IX external of the control apparatus 1, there is a line 5 having an air switch 6 whereby the line 3 may be connected selectively to one of the several lines 7a–7i running to the respective test devices. Likewise there are connected to the line 3 a manometer 8 and an electrically driven air responsive recorder 9, the continuous chart paper strip 10 of which is advanced for the recorder pen 11 to trace a curve 12. Selectively adjusted different chart speeds are available for the recorder strip which as need is resettable to its strating point.

In FIG. 2 further curves are represented on the diagrammatic strip, as examples of those traced by the test devices above which they respectively appear.

To the extreme left of the control device 1, a test device I for measurement of the moisture content of molding sand is connected to switch 6 by an air line 7a, at its outer end provided with a flat radially extending plate 13. Beneath the latter there is disposed a further plate 14 having a high drawn rim, which is secured on the end of a double arm lever 15 tippable to a slight degree about the fulcrum bearing 16. The other end of the lever 15 is provided with a pan 17 to receive the moist molding sand 18 in a determined amount; and adjacent thereover is arranged an infrared lamp 19 as a heat source. As soon as the heat source is turned on and the sample begins to dry and become lighter, the gap spacing between the plates 13 and 14 becomes greater with a constant air stream. Thus there arises a pressure change in the air line which is registered through the air recorder 9, for example in a trace or curve 20 (FIG. 2) representing the time course of drying and finally the moisture of the molding sand.

Further there is a strength testing device II selectively connected as desired to the control apparatus 1 by the air line 7b. It is comprised of a cylinder 21 with a piston 22 acting through a double armed lever 23 upon the specimen 24; whereby, corresponding to the choice of the applied force, the specimen body can be tested for compression, shear, tension and for bending or transverse strength. The test specimens can be comprised of the various molding materials usual in foundries. The trace 25 given in the diagram strip 10, obtained by testing, shows, for example, the compression strength, and the curve 26 shear strength, wherein the curve progress of both curves is obtained as a function of the loading speed or rate. The loading is adjustable continuously in stepless manner through an adjustable needle valve 27 in the air line 7b in combination with the air storage vessel 28. Through the pressure produced by the electric pump 2 the pressure in the cylinder 21 becomes greater with increasing time up to the peak or point of the curve 25 or 26, where on breaking of the test body the device suddenly is exhausted of air.

At III there is represented the testing of the gas permeability of a compacted molding sand 29 disposed in a ram cylinder 30, at one end closed through plug 31 but with the opposite end open. The air supplied through the line 7c undergoes a throttling effect dependent of the gas permeability of the test sample 29 which thereby acts as a nozzle. In the adjacent curve the gas permeability is given at 32. The vertical curves or lines 33 are caused through turning the testing device on and off.

The testing device IV for measurement of the roughness of a surface is comprised of a nozzle 34 connected to the air line 7d and moved about over the surface 35 of the test specimen; and as the test result on the diagram strip 10 there is obtained a zig-zag curve 36 which reproduces in magnified form the roughness of or along a given measurement path.

The testing device at V produces measurement values from which the mass sustainability of the molding sand is ascertainable. On the compacted molding sand specimen there is applied a small piston-like pressure plate 37, which is pressed into the sand through a separate pump and piston system 38, 38a independent of the pump 2 in the control apparatus 1.

On the lever arm 39 rests a member of the valve 40 connected to the air line 7e and sensitively touching and responding to the penetration of the piston 37 under increasing pressure to register the yieldability of the mold sand as the curve or trace 41 on the chart. The valve 40 (with which the like-numbered valves 40 in the devices at VII and VIII are identical or substantially so) is constructed with a piston axially displaceable in a valve housing having a valve head which permits escape to the atmosphere of air, supplied by the line 7e over the duration of the test, through a valve opening area variable dependently of its axial displacement. The pressure difference, arising in the supply pipe 7e because of the variable valve opening area, again is registered through the air recorder. The independent pump 38 is so adjusted that it produces in every test run a like constant load increase in a unit of time.

The "compressive stress" testing device VI functions by heating (with burner 42) the test specimen 43 between a fixed and movable plate, and transmitting the resulting expansion to two superimposed flat ground plates 44 and 45 between which, depending upon the transmitter pressure, more or less air can escape. The pressure difference in the air line again is registered through the air recorder 9 in the curve designated 46 as a function of the compressive stress so developed.

In the case of the expansion measuring device VII, there is measured the surface of the preferably cylindrical test sample 47, which is heated by the adjacent gas burner 42. The expansion is transmitted to a double armed lever 48, and the deflection of the lever 48 is transmitted to another valve 40 connected with the line 7g, of which the structure and function is similar to that of the like numbered valve described in connection with device V. The upper sensing end of the lever 48 selectively is applied to the specimen 47 at different distances beneath its heated top surface. Thus different expansion curves are obtained at the differing zones beneath the top surface, which are represented in the adjacent diagram for measuring points 1 mm., 3 mm., 5 mm., 7 mm., and 9 mm., beneath the top surface, the first curve being indicated by reference numeral 49. All these curves have the same starting point, as obtained through setting back the air recorder, and by ensuring that the heating of the sample body and the tracing by the air recorder start simultaneously. This is also described later.

The transverse bending measuring device VIII is comprised of a lever 50 applied as a feeler with very light pressure beneath a cylindrical test specimen disc 51, and a valve 40 connected with the line 7h (the manner of functioning of which has been already described), in combination with the air recorder 9 for recording the transverse bending upon heating of the top surface. Different loadings can also be provided, so that the transverse bending can be measured under different pre-loadings. Two curves 52 and 53, assuming different test bodies, have an identical starting point through back-positioning of the air recorder 9. Comparison of curves with simultaneous starting points is of importance, because this shows the relation of different molding sands to one another. For evaluation not only is measurement of the maximum essential, but also the determination of the elapsed heating time at which a maximum appears and the reverse bending sets in.

A hot tensile strength testing device IX measures the tensile strength of molding sand test specimens, which are very strongly electrically heated superficially by a Sillit rod 54. The tensile force acting upon the test body 55 is obtained through a piston 56. The test specimen 55 can be set up with a determined pre-loading before the heating, which can be adjusted through a "false air supply" or reference air supply in the air pipe. To this end a stopcock or valve 57 is included in the air pipe 7i which opens exteriorly and is opened more or less widely corresponding to the desired pre-load. The amount of the pre-load is apparent through the height of the horizontal lines 58 in the related diagram. At the moment the heat radiation begins through the Sillit rod, the registering trace through the air recorder 9 also begins, which records a horizontal line 58 up to the instant of fracture of the test specimen. At this moment the pneumatic discharge occurs and the curve falls vertically. The end point of these two right angular intersecting straight lines is the desired measured value. Insofar as further identical test specimens are tested with other pre-loads, several corner points 59 are obtained as shown in the represented diagram, which by joining of the corner points leads to the curve 60 representing the thermal strength line.

The aforenamed short time experiments, wherein the test devices II to V carry out the testing at room temperature and the devices VI to IX the tests at higher temperatures, proceed in the case of the latter so that the air recorder 9 begins the recording at the same point of time as the heat influence. For this end where gas heating is used, for which preferably acetylene gas is stored in a tank 61, there is a magnetic valve 63 included in the gas pipe 62 to the burners 42, which valve is coupled electrically through the leads 64 with the synchromotor of the air recorder. By having a constantly burning pilot flame at the burners 42, the activation of the switch 65 effects the simultaneous initiation of the heating and of the recording. The switch 66 serves for turning the electric pump off and on; and the switch 67 for turning on the electrical heating Sillit rod 54, at which time the magnetic valve 63 for the gas burners 42 is correspondingly turned off.

The molding sand testing devices II, III, IV, VI, and IX without valves 40 operate in an air pressure region of from 0 to 1.5 meters of water, the others in a region between 1 to 2.5 meters of water. The paper advance of the air recorder is selectively 6, 12 and 24 cm. advance per minute for example.

The testing devices can be permanently connected to the control apparatus 1. But they can also then be disconnected when not in use, where the connection of the air lines 7 is attained through a flexible tubular piece of rubber or the like. Finally, a single shiftable gas burner 42 can be used for the devices VI to VIII.

The pump 2 of the control apparatus 1 is repeatedly tested or standardized for its normal performance in this fashion, that a permanently built-in standard nozzle present in the control apparatus 1 is cut into the system through a special pipe or line by means of the switch 6. The manometer 8 or the air recorder 9 then show standardized markings at correct pump adjustments. Corrections are undertaken or made through an actuation of a lever on the pump 2 which varies the pump output.

A universal molding material testing is carried out by means of the apparatus in accordance with the invention by investigating samples of identical material one after another on all test steps. An evaluation of the diagram series enables important predictions about the behavior of a molding material in all areas of application in a foundry.

I claim:

Testing apparatus for measurement of physical characteristics of refractory materials, particularly molding sands, comprising a continuously operable electrically driven air pump having an air discharge pneumatic line, a manometer on said line, an air pressure recorder responsive to air pressure having a continual paper-advancing electric drive and connected on said line to record the air pressure therein, a plurality of air-line connectors, and an air-switching means for selective supply of air from said pump through said pneumatic line to a selected one of said connectors;

said recorder, pump, manometer, switching means and connectors comprising a testing control unit; and a plurality of diverse molding-sand specimen testing devices each for its operation utilizing a continuously flowing stream of air and connected to a respective air-line connector for a pressurized air supply selectably from said pneumatic line and affecting the air pressure in said line responsively for a specimen characteristic being therein tested whereby the recorder provides a curve for the operation of each said device;

at least one of said testing devices additionally to utilization of air from said pneumatic line further having means for heating a specimen being tested therein; and switch means included in said control unit for starting the recorder drive simultaneously with said heating means.

References Cited

UNITED STATES PATENTS

| | | | |
|---|---|---|---|
| 2,417,988 | 3/1947 | Mooney | 73—37 |
| 2,423,340 | 7/1947 | Pellettere | 346—33 |
| 2,669,247 | 2/1954 | Olah | 73—432 |
| 2,791,120 | 5/1957 | Dietert et al. | 73—38 |
| 2,814,198 | 11/1957 | Howland | 73—147 |
| 3,071,006 | 1/1963 | Hornfeck | 73—432 |
| 3,093,003 | 6/1963 | Cochinal et al. | 73—432 |
| 3,172,285 | 3/1965 | Dietert et al. | 73—38 |
| 3,180,133 | 4/1965 | Rayme | 73—38 |

DAVID SCHONBERG, *Primary Examiner.*